United States Patent [19]

Suzuki

[11] Patent Number: 5,051,316

[45] Date of Patent: Sep. 24, 1991

[54] OVERLAY ALLOY OR PLAIN BEARING

[75] Inventor: Takashi Suzuki, Shizuoka, Japan

[73] Assignee: Taiho Kogyo Co., Ltd., Toyota, Japan

[21] Appl. No.: 527,984

[22] Filed: May 24, 1990

[30] Foreign Application Priority Data

May 25, 1989 [JP] Japan ................. 1-130229

[51] Int. Cl.$^5$ ............... B32B 15/01; C22C 11/00; C22C 11/08
[52] U.S. Cl. .................. 428/645; 420/555; 420/566; 420/572
[58] Field of Search ............ 420/566, 572, 555; 428/645

[56]     References Cited

U.S. PATENT DOCUMENTS

| 1,715,599 | 6/1929 | Hixson | 420/572 |
|---|---|---|---|
| 2,340,383 | 2/1944 | Hillix | 420/572 |
| 2,623,273 | 12/1952 | Murray | 420/566 |
| 3,309,064 | 1/1982 | Fukuoka | 308/237 |
| 4,206,268 | 6/1980 | Roemer et al. | 428/645 |
| 4,468,415 | 8/1984 | Kuboyama et al. | 420/572 |
| 4,470,184 | 9/1984 | Fukuoka | 427/383 |
| 4,504,849 | 3/1985 | Davies et al. | 420/566 |
| 4,512,950 | 4/1985 | Hosoda et al. | 420/566 |
| 4,591,536 | 5/1986 | Hodes et al. | 428/645 |
| 4,877,696 | 10/1989 | Muto | 428/645 |
| 4,927,715 | 5/1990 | Mori | 428/645 |
| 4,937,149 | 6/1990 | Mori | 428/645 |
| 4,978,587 | 12/1990 | Mori et al. | 428/645 |

FOREIGN PATENT DOCUMENTS

| 0463534 | 3/1950 | Canada | 420/566 |
|---|---|---|---|
| 51-42124 | 3/1982 | Japan | 420/566 |
| 59-28598 | 2/1984 | Japan | 420/566 |
| 61-222140 | 10/1986 | Japan | 420/555 |
| 0569781 | 6/1945 | United Kingdom | 420/566 |
| 733212 | 7/1955 | United Kingdom . | |
| 750557 | 6/1956 | United Kingdom . | |
| 1353149 | 5/1974 | United Kingdom . | |

*Primary Examiner*—Richard D. Dean
*Assistant Examiner*—David W. Schumaker
*Attorney, Agent, or Firm*—Armstrong, Nakaido, Marmelstein, Kubovcik & Murray

[57]     ABSTRACT

A Pb-based overlay alloy of a plain bearing contains 3%–20% of In and more than 0.5% to 9% of Sb, and, preferably 0.1%–5% of Ag, Cu, Ni, and/or Mn, and exhibits improved properties at a high temperature and corrosive condition of deteriorated lubricating oil.

10 Claims, No Drawings

OVERLAY ALLOY OR PLAIN BEARING

BACKGROUND OF INVENTION

1. Field of the Invention

The present invention relates to an overlay alloy used for a plain bearing. More particularly, the present invention relates to an overlay alloy which is composed mainly of Pb, exhibits excellent corrosion-resistance and fatigue-resistance, and, in particular, slides on a crank shaft of an internal combustion engine.

2. Description of Related Arts

The plain bearing of an internal combustion engine is embodied as a combination of a cylindrical bush, a half cylindrical bearing and a thrust bearing. A plain bearing consists of a backing strip which is usually made of steel, a plain bearing alloy which is bonded to the backing strip and which is usually referred to as a lining, and an overlay bonded to the lining.

The overlay alloy is a soft alloy mainly composed of lead or lead and tin. Improvements in its properties have been made by devicing various additives.

The plain bearing shown in Japanese Examined Patent Publication No. 39-22498, which corresponds to G.B. Patent No. 989,946, is one in which an overlay alloy which contains from 2 to 10% by weight of In, and further at least one optional additive element, such as from 0.1 to 3% by weight of Cu, from 0.001 to 0.25% by weight of Te, not more that 0.5% by weight of Ag, and not more than 0.5% by weight of Sb, the balance being Pb, is bonded on the lining which consists of a Cu-Pb alloy. In, Cu and Te allegedly improve the corrosion-resistance of the cast alloy according to the description of the above publication.

An overlay alloy shown in Japanese Unexamined Patent Publication No. 61-266,544 contains from 1 to 10% by weight of In, and from 0.1 to 6% by weight of Cu, as well as not more than 8% by weight of Sn as the optional additive element, the balance being Pb. Cu is allegedly effective for refining the surface layer of the alloy and retarding the diffusion of In into the underlying layer, thereby improving the corrosion-resistance and the fatigue-resistance according to the description of the publication. In allegedly improves corrosion-resistance, particularly when Sn and In are both present.

The present assignee proposed in Japanese Unexamined Patent Publication No. 59-205,442 an overlay alloy which contains from more than 10% to 15% by weight of In and/or Tl, from 2 to 10% by weight of Sn, and from 0.05 to 5% by weight of one or more of Cu, Sb, Mn, Ni, Ca, Bi, and Ba. Allegedly, In and Tl mainly improve the corrosion-resistance, and Cu and the like form intermetallic compounds and also mainly improve the corrosion-resistance.

Since internal combustion engines in recent years are being operated at higher temperatures, under heavier-loads, and over longer periods of time, the properties required of an overlay become more and more severe.

Sn is contained as an essential element of the overlay disclosed in Japanese Unexamined Patent Publication No. 59-205,442, and is also contained as an optional element of the overlay disclosed in Japanese Unexamined Patent Publication No. 61-266,544. Sn can enhance the corrosion-resistance and fatigue-resistance in an ordinary Pb-based overlay. The thus enhanced corrosion-resistance and fatigue resistance deteriorate during service of a plain bearing because Sn diffuses from the overlay to the lining. A Ni barrier layer, which is interposed between the lining and the overlay of an ordinary bearing so as to prevent the Sn diffusion, becomes ineffective at the high temperatures at which internal combustion engines are recently operated. Notwithstanding the presence of the Ni plating layer, Sn diffuses from the overlay to the lining, with the result that Sn is deficient and, further, crystal defects, such as vacancies, generate in the overlay. As a result, the corrosion-resistance and fatigue-resistance deteriorate. Note that the Sn and Ni actively react with one another at a high temperature, and, therefore, the Sn plating layer is a drawback in enhancing the properties of an overlay used at a high temperature.

Cu, which is added in the overlay alloy of Japanese Unexamined Patent Publication No. 59-205,442, also reacts with Ni of the diffusion-barrier layer at a high temperature, and hence diffuses into the lining. As a result, Cu becomes deficient in the overlay, thus impairing fatigue resistance. In addition, In and Sn, which are added together in the overlay of said publication, cause drastic reduction of the melting point or solidus so that the diffusion of Sn and Cu is very liable to occur.

Since Cu and In are essential in the overlay shown in Japanese Unexamined Patent Publication No. 61-266,544, the diffusion of Sn and Cu is very liable to occur as described above.

The overlay shown in Japanese Examined Patent Publication No. 39-22498 is the subject matter of an application based on the Convention Priority on 1960. At that time, conditions under which the internal combustion engine was used were considerably less severe than at present. The Ni barrier is not mentioned in said publication. It seems rather that the In diffusion of the overlay into the lining and the positive Cu diffusion of the lining into the overlay are merely mentioned.

SUMMARY OF THE INVENTION

It is an object of the present invention to improve corrosion-resistance and fatigue-resistance of an overlay alloy used on a plain bearing which bearing is used in an internal combustion engine operated at a high revolution and a high output.

It is another object of the present invention to improve the corrosion-resistance and the fatigue-resistance of an overlay alloy which is used for parts of an internal combustion engine which may be heated to a temperature as high as 160° C. of the lubricating oil.

It is further object of the present invention to provide an overlay alloy having improved, wear-resistance and fatigue-resistance and used on a plain bearing which is subject to a high load such as encountered by recent internal combustion engines.

It is a yet another object of the present invention to provide an overlay alloy having further improved wear-resistance, corrosion-resistance and fatigue-resistance when exposed to a high temperature and a high load for a long period of time in particular engines, such as Diesel engines.

It is another object of the present invention to provide an overlay alloy which is free of Sn so as to exclude the Sn diffusion problem, and which is bonded with the barrier layer such as Ni.

In accordance with the objects of the present invention there is provided an overlay alloy which contains, by weight percentage, from 3% to 20% of In, and from more than 0.5% to 9% of Sb, the balance being Pb and impurities.

There is also provided an overlay alloy which contains, by weight percentage, from 3% to 20% of In, from more than 0.5% to 9% of Sb, and from 0.1% to 5% of at least one element selected from the group consisting of Ag, Cu, Ni, and Mn, the balance being Pb and unavoidable impurities.

Alloying Elements

The present invention is described hereinafter in detail. Percentage is weight % unless otherwise specified.

In exhibits conformability. In, which is solid-dissolved in Pb, drastically enhances corrosion-resistance and somewhat enhances fatigue-resistance. When the In content is less than 3%, In is not effective for enhancing corrosion-resistance. On the other hand, when the In content is more than 20%, the melting point becomes so low that the properties, especially wear-resistance at a high temperature, deteriorate. The In content is therefore set in 3 to 20%. A preferable In content is from 5 to 12%.

Pb is the main component of the alloy according to the present invention and exhibits conformability which is required for an overlay. Pb forms a solid-solution, in which In is substantially dissolved and which exhibits good corrosion-resistance. The constitutional elements of this solid solution are difficult to diffuse. During service for a long-period of time, the elements of the overlay alloy according to the present invention are contained in the overlay as its production. The elements are therefore well balanced in the overlay during its service so that the initial properties of the overlay are maintained and hence a long life of the overlay is attained.

The matrix of the overlay alloy according to the present invention consists of crystal grains of Pb-In solid solution. Since the matrix of the overlay alloy according to the present invention is free of Sn, the enhancement of corrosion-resistance due to Sn is not provided. Thus at the initial period of service of a plain bearing, corrosion-resistance of the overlay alloy according to the present invention is inferior to that of the conventional Pb-Sn-In based overlay alloy. However, the elements of the overlay alloy according to the present invention are balanced during the service of the plain bearing. That is, the unbalance of elements due to Sn diffusion does not occur in the overlay alloy according to the present invention. The corrosion-resistance attained by the present invention is therefore stable and is superior to that of the conventional overlay alloy in the long term.

The growth of crystal grains occurs at a high temperature during the service of an overlay and causes the deterioration of properties. Sb is added according to the present invention as a countermeasure against the grain growth, and to maintain the wear-resistance at a certain level. Most of the Sb added precipitates as hard minority phases. In other words, the wear-resistance is unsatisfactory in the Pb-In solid solution but is supplemented by Sb which forms the hard precipitates. Sb also enhances the elongation of an overlay alloy and hence the fatigue-resistance. The Sb minority phases suppress the growth of crystal grains and, hence the decrease in the strength and fatigue-strength during the service of an overlay for a long period of time.

The effects of Sb are demonstrated at an Sb content exceeding 0.5%. The effects of Sb are greater if the Sb content is greater. When the Sb content is more than 9%, the hardening due to the Sb minority phases becomes too great to use the soft property of the Pb-In solid solution and to maintain conformability. A preferable Sb content is from 1.5% to 7%.

Ag, Cu, Ni, and Mn form intermetallic compounds with one or both of In and Sb, such as In-Sb-Ag, In-Sb-Cu, In-Sb-Ni, In-Sb-Mn, and In-Ag. These intermetallic compounds are precipitated due to the addition of Ag, Cu, Ni, and Mn and thus provide wear-resistance and suppress grain growth. When the content of Ag, Cu, Ni, and/or Mn is less than 0.1%, they merely behave as impurities. On the other hand, when such content exceeds 5%, the soft property of Pb-In solid solution is not utilized and the conformability is lessened. A preferable content of Ag, Cu, Ni, or Mn is from 0.2% to 3%. A more preferable content is from 0.5% to 2%.

The elements other than those described above are impurities. The representative elements are Fe, Sn, Zn, and the like. The maximum content of impurities is preferably 0.2% alone or in combination.

Process for Producing Overlay

The overlay according to the present invention is produced by means of casting, electroplating method, or PVD method, such as sputtering. Since the grains of an overlay produced by the casting method are coarse, the electroplating method and PVD method are preferred. One target is prepared for each element of the overlay alloy, and the thus-prepared targets are used together to produce an overlay by the single PVD process. The PVD method and the electroplating method may be combined in such a manner that the elements other than In are formed as a first layer on the lining, In is electroplated as a second layer on the first layer, and, subsequently, annealing is carried out so as to cause diffusion between the first and second layers. The electroplating method is preferred in the light of productivity in mass production.

The thickness of an overlay according to the present invention is determined depending upon the condition of service of a plain bearing and is not specifically limited. The thickness of an overlay according to the present invention is from 1 to 30 μm.

The plain bearing, on which an overlay according to the present invention is used, may have any structure which is determined depending upon its condition of service. However, the barrier layer consisting of Ni or Cu is necessary in most cases so as to prevent diffusion of In which is likely to occur in recent internal combustion engines. The lining may have any material, shape or dimension determined by the operating conditions of recent internal engines.

The present invention is hereinafter described with reference to the examples.

Sliding bearings were produced by using the following parts.
A. Backing strip: a thin sheet of soft steel (SPCC)
B. Lining: Cu-24% Pb-3.5% Sn sintered material
C. Nickel barrier: 1.5 μm thick
D. Overlay: 15 μm thick A Pb-In-Sb overlay was produced by carrying out the following steps subsequent to the Ni-barrier plating, and then water rinsing.
1. Pb-Sb plating (14 μm thick)
   Composition of plating bath:
   Lead borofluoride—50-200 g/l in terms of Pb-ion Antimony borofluoride—0.2-5 g/l in terms of Sb ion concentration
Hydrogen borofluoric acid—20-120 g/l (additives hydroquinons and the like) —1-5 g/l
Plating Condition:
Liquid temperature—5°-50° C.
Current density—2.0-6.0 A/dm²
2. Water Rinsing
3. In Plating (1 μm thick)
Sulfamic acid plating bath:
Indium sulfamate—40-210 g/l
Sulfamic acid—10-60 g/l
NaCl—15-100 g/l
Dextrose—2-25 g/l
Triethanolamine—1-5 g/l
Sodium sulfamate—70-320 g/l
Liquid temperature—10°-50° C.
Current density—1-10 A/dm²
pH—3.8 or less
4. Rinse with hot water
5. Annealing—100°-200° C. (In diffuses into the Pb—Sb plating layer)

The Pb-In-Sb-Ag, Cu, Ni, Mn overlay was produced by the processes 1-5 described above except that the borofluorides of Ag, Cu, Ni, and/or Mn were added to the plating bath of item 1, above.

The performances of the plain bearing produced as described above were tested by the following method.

1. Dynamic corrosion test

The plain bearings were dipped in deteriorated oil and heated at 180° C. for 400 hours, so as to simulate the actual service of a plain bearing for a long period of time. The sliding bearings were then subjected to the alternative dynamic load test with the use of the identical degraded oil under the following conditions.
Load—245 kgf/cm²
temperature of lubricating oil—140° C.

The load was determined taking into consideration the operating condition of an internal combustion engine at a high load.

The corrosion-resistance of an overlay was evaluated by noting the time it takes for the overlay to disappear on the entire width of the overlay at a central part thereof as seen in the circumferential direction.

2. Fatigue test:
Tester—Reciprocating dynamic load tester
Load—800 kgf/cm²
Rotation—3000 rpm
Temperature of lubricating oil—120° C.

The results are given in Table 1.

The comparative material 36 is one in which Cu is added. instead of Sb. The fatigue-resistance of this material is very poor. It is therefore apparent that Cu does not have the same effects as Sb. The comparative material 37 is one in which Sn is added to investigate the influence of Sn upon the corrosion-resistance. The corrosion-resistance of this material is very poor. It is therefore apparent that Sn is detrimental to the corrosion-resistance in use over a long-period.

The comparative material 38 is one with a small content of Sb and exhibits a performance almost the same as comparative material 36.

TABLE 1

| Samples | Composition | | | | | | | | Corrosion-Registance (hr) | Fatigue-Resistance (Revolution Number × 10⁵) |
| --- | --- | --- | --- | --- | --- | --- | --- | --- | --- | --- |
| | Pb | In | Sb | Cu | Ag | Ni | Mn | Sn | | |
| Inventive | | | | | | | | | | |
| 1 | Bal | 3 | 5.0 | — | — | — | — | — | 75 | 13.7 |
| 2 | Bal | 5 | 3.0 | — | — | — | — | — | 100 | 14.3 |
| 3 | Bal | 8 | 1.2 | — | — | — | — | — | 200 | 8.7 |
| 4 | Bal | 8 | 2.0 | — | — | — | — | — | 200 | 14.3 |
| 5 | Bal | 8 | 3.0 | — | — | — | — | — | 225 | 21.1 |
| 6 | Bal | 8 | 5.0 | — | — | — | — | — | 250 | 19.5 |
| 7 | Bal | 8 | 7.0 | — | — | — | — | — | 200 | 15.3 |
| 8 | Bal | 12 | 1.1 | — | — | — | — | — | 225 | 7.9 |
| 9 | Bal | 12 | 2.0 | — | — | — | — | — | 250 | 14.4 |
| 10 | Bal | 12 | 6.0 | — | — | — | — | — | 250 | 18.2 |
| 11 | Bal | 15 | 3.0 | — | — | — | — | — | 225 | 19.4 |
| 12 | Bal | 15 | 9.0 | — | — | — | — | — | 225 | 13.6 |
| 13 | Bal | 20 | 0.6 | — | — | — | — | — | 250 | 5.1 |
| 14 | Bal | 20 | 3.0 | — | — | — | — | — | 250 | 17.3 |
| 15 | Bal | 20 | 7.0 | — | — | — | — | — | 225 | 17.2 |
| 16 | Bal | 3 | 4.0 | 3.0 | — | — | — | — | 75 | 16.6 |
| 17 | Bal | 5 | 5.0 | 1.0 | — | — | — | — | 150 | 18.7 |
| 18 | Bal | 8 | 0.6 | — | 2.0 | — | — | — | 250 | 9.9 |
| 19 | Bal | 8 | 1.5 | — | — | 1.5 | — | — | 200 | 21.5 |
| 20 | Bal | 8 | 3.0 | — | 1.0 | — | — | — | 250 | 14.2 |
| 21 | Bal | 10 | 0.7 | 0.5 | 0.5 | 0.5 | — | — | 250 | 10.6 |
| 22 | Bal | 10 | 1.4 | — | 1.0 | — | 0.5 | — | 250 | 15.0 |
| 23 | Bal | 10 | 3.0 | 0.1 | — | — | — | — | 250 | 21.5 |
| 24 | Bal | 10 | 3.0 | 1.0 | 0.5 | — | — | — | 225 | 22.8 |
| 25 | Bal | 10 | 3.0 | 2.0 | — | 0.5 | — | — | 250 | 24.3 |
| 26 | Bal | 10 | 3.0 | 5.0 | — | — | — | — | 225 | 23.2 |
| 27 | Bal | 10 | 3.5 | 2.0 | — | — | — | — | 225 | 25.1 |
| 28 | Bal | 10 | 4.5 | 0.1 | 0.1 | — | — | — | 225 | 20.8 |
| 29 | Bal | 10 | 6.5 | — | — | 0.3 | 0.3 | — | 225 | 19.2 |
| 30 | Bal | 12 | 2.5 | — | 0.5 | — | — | — | 250 | 20.0 |
| 31 | Bal | 12 | 7.0 | — | — | — | 0.5 | — | 250 | 19.5 |
| 32 | Bal | 15 | 1.1 | 1.0 | 1.0 | 1.0 | 1.0 | — | 225 | 17.4 |
| 33 | Bal | 15 | 9.0 | 1.0 | 1.0 | — | — | — | 225 | 18.3 |
| 34 | Bal | 18 | 0.8 | — | 0.5 | 0.5 | — | — | 200 | 9.3 |
| 35 | Bal | 20 | 4.0 | 0.5 | — | — | 0.5 | — | 200 | 19.2 |
| Comparative | | | | | | | | | | |
| 36 | Bal | 8 | — | 1.5 | — | — | — | — | 150 | 3.2 |
| 37 | Bal | 12 | 2.0 | — | — | — | — | 8 | 25 | 18.1 |

TABLE 1-continued

| Samples | Composition | | | | | | | | Corrosion-Resistance (hr) | Fatigue-Resistance (Revolution Number × 10⁵) |
| --- | --- | --- | --- | --- | --- | --- | --- | --- | --- | --- |
| | Pb | In | Sb | Cu | Ag | Ni | Mn | Sn | | |
| 38 | Bal | 8 | 0.3 | — | — | — | — | — | 200 | 3.5 |
| Target Value | | | | | | | | | ≧75 | ≧5.0 |

I claim:

1. A plain bearing comprising a backing, a lining and an overlay layer formed on or over said lining, wherein said overlay layer consists essentially of an alloy consisting of from 3 to 20% by weight of In, from 0.5 to 9% by weight of Sb, and the balance is Pb and unavoidable impurities.

2. A plain bearing according to claim 1, wherein said overlay layer alloy has an In content of from 5 to 20% by weight.

3. A plain bearing according to claim 1, wherein said overlay layer alloy has an Sb content of from 1.5 to 7% by weight.

4. A plain bearing according to claims 2 or 3, wherein the overlay layer alloy is formed by electroplating.

5. A plain bearing according to claim 4, wherein said overlay layer alloy is applied at a thickness of from 1 to 30 μm.

6. A plain bearing comprising a backing, a lining, and an overlay layer formed on said lining, wherein said overlay layer consists essentially of an alloy consisting of from 3 to 20% by weight of In, from 0.5 to 9% by weight of Sb, from 0.1 to 5% by weight of at least one element selected from the group consisting of Ag, Cu, Ni, and Mn, and the balance is Pb and unavoidable impurities.

7. A plain bearing according to claim 6, wherein said overlay layer alloy has an In content of from 5 to 20% by weight.

8. A plain bearing according to claim 6, wherein said overlay layer alloy has an Sb content of from 1.5 to 7% by weight.

9. A plain bearing according to claims 7 or 8, wherein the overlay layer alloy is formed by electroplating.

10. A plain bearing according to claim 9, wherein said overlay layer alloy is applied at a thickness of from 1 to 30 μm.

* * * * *